(12) United States Patent
Michalopoulos

(10) Patent No.: US 12,058,706 B2
(45) Date of Patent: Aug. 6, 2024

(54) APPARATUS AND METHOD TO ESTIMATE UE POSITION

(71) Applicant: NOKIA TECHNOLOGIES OY, Espoo (FI)

(72) Inventor: Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 403 days.

(21) Appl. No.: 17/289,996

(22) PCT Filed: Nov. 30, 2018

(86) PCT No.: PCT/EP2018/083088
§ 371 (c)(1),
(2) Date: Apr. 29, 2021

(87) PCT Pub. No.: WO2020/088785
PCT Pub. Date: May 7, 2020

(65) Prior Publication Data
US 2022/0022182 A1    Jan. 20, 2022

(30) Foreign Application Priority Data
Oct. 29, 2018   (GR) .............................. 20180100489

(51) Int. Cl.
  H04W 72/51    (2023.01)
  H04W 72/044   (2023.01)

(52) U.S. Cl.
  CPC ......... H04W 72/51 (2023.01); H04W 72/044 (2013.01)

(58) Field of Classification Search
  CPC ..... H04W 72/51; H04W 72/044; H04B 7/086
  See application file for complete search history.

(56) References Cited

U.S. PATENT DOCUMENTS 6,195,556 B1    2/2001  Reudink et al.
10,340,993 B2*  7/2019  Järmyr ................. H04B 7/043
(Continued)

FOREIGN PATENT DOCUMENTS

AU    2018310427 A1 *  1/2020  ......... G01S 1/0428
EP      2224262 A1 *  9/2010  ......... G01S 13/003
(Continued)

OTHER PUBLICATIONS

User positioning in mmW 5G networks using beam-RSRP measurements and kalman filtering. Rastorgueva-Foi, E., Costa, M., Koivisto, M., Leppänen, K., & Valkama, M. (2018). (Year: 2018).*
(Continued)

*Primary Examiner* — Yuwen Pan
*Assistant Examiner* — Swati Jain
(74) *Attorney, Agent, or Firm* — Barta Jones, PLLC

(57) ABSTRACT

It is provided a method, comprising determining a respective elevation of each of plural beams from an access point based on stored configuration data, wherein each of the plural beams is identified by a respective identification included in an indication comprising the identification of the respective beam and an information on a respective received beam power, and the indication is received from a terminal; selecting a first beam and a second beam among the plural beams such that the elevation of the first beam is different from the elevation of the second beam; retrieving, from the stored configuration data, a transmit power of the first beam and a transmit power of the second beam; estimating an estimated elevation of a line connecting the access point and the terminal based on the received beam powers, the transmit powers, and the elevations.

15 Claims, 4 Drawing Sheets

(56) References Cited

U.S. PATENT DOCUMENTS

| | | | |
|---|---|---|---|
| 10,454,551 B2* | 10/2019 | Baek | H04B 7/0608 |
| 2002/0002066 A1* | 1/2002 | Pallonen | G01S 3/28 |
| | | | 455/562.1 |
| 2003/0117320 A1* | 6/2003 | Kim | G01S 11/02 |
| | | | 342/457 |
| 2013/0009821 A1* | 1/2013 | Steer | G01S 1/14 |
| | | | 342/417 |
| 2015/0365908 A1* | 12/2015 | Maltsev | H04W 52/42 |
| | | | 455/522 |
| 2016/0295366 A1* | 10/2016 | Priyanto | H04W 4/023 |
| 2018/0205421 A1* | 7/2018 | Park | H04W 64/006 |
| 2018/0234937 A1* | 8/2018 | Yoon | H04B 17/318 |
| 2019/0053071 A1* | 2/2019 | Ly | H04B 7/0617 |
| 2019/0239235 A1* | 8/2019 | Pefkianakis | H04L 41/147 |
| 2019/0320408 A1* | 10/2019 | Opshaug | G01S 5/0218 |
| 2020/0007209 A1* | 1/2020 | Kang | H04B 7/0695 |
| 2020/0088869 A1* | 3/2020 | Pefkianakis | H04W 64/006 |
| 2020/0107288 A1* | 4/2020 | Kumar | H04B 7/088 |
| 2022/0113365 A1* | 4/2022 | Sosnin | H04W 64/00 |
| 2022/0377701 A1* | 11/2022 | Edge | H04W 4/029 |
| 2022/0417890 A1* | 12/2022 | Opshaug | H04W 16/28 |
| 2024/0063926 A1* | 2/2024 | Kurras | H04B 17/309 |

FOREIGN PATENT DOCUMENTS

| | | | | |
|---|---|---|---|---|
| JP | 6141154 B2 * | 6/2017 | | |
| WO | WO-9819488 A1 * | 5/1998 | | G01S 3/46 |
| WO | WO-2015152931 A1 * | 10/2015 | | H04W 16/24 |
| WO | WO-2017164925 A1 * | 9/2017 | | G01S 1/08 |
| WO | WO 2018/155844 A1 | 8/2018 | | |
| WO | WO-2020068310 A1 * | 4/2020 | | G01S 1/20 |

OTHER PUBLICATIONS

Communication pursuant to Article 94(e) EPC dated May 10, 2023 corresponding to European Patent Application No. 18811803.8.

International Search Report and Written Opinion dated Jul. 2, 2019 corresponding to International Patent Application No. PCT/EP2018/083088.

E. Rastorgueva-Foi et al., "User Positioning in mmW 5G Networks using Beam-RSRP Measurements and Kalman Filtering," Arxiv Org., arXiv:1803.09478v1 [cs.IT] Mar. 26, 2018, https://arxiv.org/pdf/1803.09478.pdf.

3GPP TS 36.305 V10.5.0 (Dec. 2012), Technical Specification, 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10), Dec. 2012.

3GPP TS 36.355 V14.7.0 (Sep. 2018), Technical Specification, 3rd Generation Partnership Project; Technical Specification Group Radio Access Network; Evolved Universal Terrestrial Radio Access (E-UTRA); LTE Positioning Protocol (LPP) (Release 14), Sep. 2018.

* cited by examiner

APPARATUS AND METHOD TO ESTIMATE UE POSITION

FIELD OF THE INVENTION

The present invention relates to estimating the position of a UE.

Abbreviations

2D/3D 2-dimensional/3-dimensional
3GPP 3$^{rd}$ Generation Partnership Project
4G/5G 4$^{th}$/5$^{th}$ Generation
BF Beamforming
BRSRP Beam Reference Signal Received Power
BS Base Station
CID Cell ID
DL Downlink
DoD Direction of Departure
E-CID Enhanced CID
eNB evolved NodeB (base Station in 4G)
E-SMLC Enhanced SMLC
gNB Base Station in 5G/NR
ID Identifier
IE Information Element
ISD Inter-Site Distance
LTE Long Term Evolution
NR New Radio (air interface standard of 5G systems)
RAN Radio Access Network
RS Reference Signal
RSRP Reference Signal Received Power
RSRQ Reference Signal Received Quality
Rx Receive
SMLC Serving Mobile Location Centre
TS Technical Specification
Tx Transmit
UE User Equipment
UL Uplink

BACKGROUND OF THE INVENTION

In NR, the position of a UE may be determined using reference signals that are transmitted via the corresponding beams. Determining or estimating the position of a UE is sometimes also called positioning. An example thereof are so-called Enhanced Serving Mobile Location Centre (E-SMLC)-based positioning methods. In such methods, measurements are provided by the UE to an E-SMLC entity for calculating an estimate of the UE's position.

Beamforming is a major candidate of 5G NR. In beamforming, transmission between the UE and the access point is realized in the form of beams. Beams are usually configured in certain configurations, and grouped across different beam width groups and elevation levels.

A typical example is a 32-beam configuration, where 32 beams are used and split into three groups:
a) A group of 16 "outer" beams, covering the area close to cell edge. These beams are of narrow, "pencil" form, which corresponds to a gain of 24 dB. They have a high elevation level.
b) A group of 15 "inner beams" with lower elevation level, which are of "broadened" form, and are directed to cover the area in the middle of the cell.
c) A single "wide" beam, with even lower elevation level which is directed to cover the area close to the access point.

The elevation level is the angle between the normal on the surface at the antenna site and the direction of the beam. The direction of the beam may be defined as a line from the access point of the beam passing through the center of gravity of the power of the beam in a cross section through the beam width.

Different beams of the same group are directed into different azimuths (i.e., different horizontal directions). For example, each group may cover 360° around the base station.

An example of the above mentioned beam configurations is illustrated schematically in FIG. 1. FIG. 1 shows a cross-section through a pencil beam 701 and the base station 700. In FIG. 1, a base station 700 emits the pencil beam 701, a broadened beam 702, and a wide beam 703. The ellipses indicate schematically areas (lines in the cross-section) of a same beam power.

According to [1], reference signals are transmitted in beams with different azimuths and a same elevation from the access point (antenna (array)) to the UE. The UE measures the received power of these reference signals (RSRP, in particular BRSRP) and reports them to the BS. Then, a sequential estimation method for user positioning is applied based on the reference signal received power (RSRP) and a two-stage Kalman filtering process. Thus, in the first stage, an azimuth (projection onto the horizontal plane of an angle between a line from BS to UE and a predetermined horizontal line) of the UE (corresponding to a direction of departure (DoD)) is estimated. In the second stage of the Kalman filter, DoDs determined by different BSs are fused to estimate the position of the UE.

According to [2], narrow beams are used in a predefined map, such that, depending on the received signal strength at the UE and the time difference of arrival information, the UE is able to estimate its position. In [2], it is assumed that the UE is not able to detect (reference) signals from multiple beams departing from the same access point (base station). Rather, it is assumed that the beams of the same access point do not overlap with one another. Hence, the UE bases its position estimation based on a single beam (or based on single beams from multiple access points).

According to [3], the so-called Enhanced Cell ID (E-CID) may be used for positioning. The UE position is estimated with the knowledge of the geographical coordinates of its serving eNB. E-CID uses additional UE measurements for improving its positioning estimate, including RSRP, Reference Signal Received Quality (RSRQ), UE Rx-Tx time difference, eNB Rx-Tx time difference, Timing Advance at the eNB, and Angle of Arrival at eNB. For an accurate estimation of the UEs position, measurements corresponding to multiple cells are needed. The positioning estimation of the UE takes place at the location server, referred to as Enhanced Serving Mobile Location Centre (E-SMLC), by exploiting the information on the measurements mentioned above.

REFERENCES

[1] E. Rastorgueva-Foi, M. Costa, M. Koivisto, K. Leppanen, and M. Valkama, "User Positioning in mmW 5G Networks using Beam-RSRP Measurements and Kalman Filtering", available at arxiv platform, https://arxiv.org/pdf/1803.09478.pdf
[2] U.S. Pat. No. 6,195,556 B1: System and method of determining a mobile station's position using directable beams

[3] 3GPP TS 36.305, Evolved Universal Terrestrial Radio Access Network (E-UTRAN); Stage 2 functional specification of User Equipment (UE) positioning in E-UTRAN (Release 10)

[4] 3GPP TS 36.355, LTE Positioning Protocol, Rel 14

SUMMARY OF THE INVENTION

It is an object of the present invention to improve the prior art.

According to a first aspect of the invention, there is provided an apparatus, comprising means for determining configured to determine a respective elevation of each of plural beams from an access point based on stored configuration data, wherein each of the plural beams is identified by a respective identification included in an indication comprising the identification of the respective beam and an information on a respective received beam power, and the indication is received from a terminal; means for selecting configured to select a first beam and a second beam among the plural beams such that the elevation of the first beam is different from the elevation of the second beam; means for retrieving configured to retrieve, from the stored configuration data, a first transmit power of the first beam and a second transmit power of the second beam; means for estimating configured to estimate an estimated elevation of a connecting line connecting the access point and the terminal based on the first received beam power, the second received beam power, the first transmit power, the second transmit power, the first elevation, and the second elevation.

According to a second aspect of the invention, there is provided a method, comprising determining a respective elevation of each of plural beams from an access point based on stored configuration data, wherein each of the plural beams is identified by a respective identification included in an indication comprising the identification of the respective beam and an information on a respective received beam power, and the indication is received from a terminal; selecting a first beam and a second beam among the plural beams such that the elevation of the first beam is different from the elevation of the second beam; retrieving, from the stored configuration data, a first transmit power of the first beam and a second transmit power of the second beam; estimating an estimated elevation of a connecting line connecting the access point and the terminal based on the first received beam power, the second received beam power, the first transmit power, the second transmit power, the first elevation, and the second elevation.

The method of the second aspect may be a method of positioning.

According to a third aspect of the invention, there is provided a computer program product comprising a set of instructions which, when executed on an apparatus, is configured to cause the apparatus to carry out the method according to the second aspect.

According to some example embodiments of the invention, at least one of the following advantages may be achieved:
- position of the UE can be estimated based on beams from a single access point;
- no need for triangulation between different base stations;
- no modification of Uu interface between base station and UE needed;
- no need for additional positioning reference signal (PRS) transmitted by the base stations, since the position is estimated based on measurements of cell reference signals (which are anyway part of control plane signals transmitted by the base stations)
- if no PRS signals are transmitted, bandwidth can be saved, since the bandwidth used for PRS can be used for other purposes, e.g., for data transmission. Additionally, complexity is reduced since there is no PRS configuration (incl. PRS muting) process involved.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
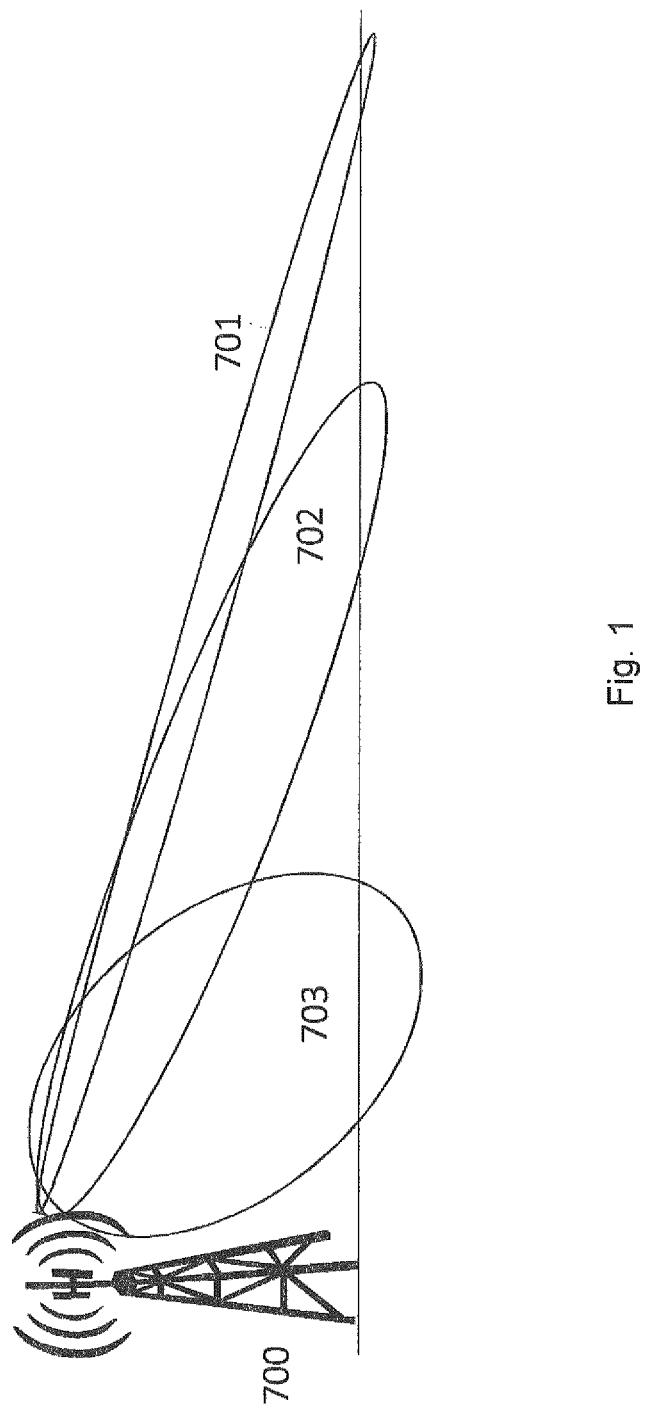
FIG. 1 shows schematically a base station with 3 beams of different elevations.

Some example embodiments of the invention enhance positioning by exploiting knowledge on the beam configurations provided by the RAN to the E-SMLC. According to some example embodiments of the invention, beam-specific reference signal measurements by the UE are used to estimate its position, in conjunction with information about the beam configurations of the access point. That is, the location server, which is the equivalent of E-SMLC in LTE, obtains information about the power of the reference signals per beam that the UE measures, along with information on the beam configuration (cf. FIG. 1) of the beams transmitted from the given access point. Such beam configuration information includes the number of transmitted beams per cell, their grouping (for instance, into pencil outer beams, broadened inner beams, if any) as well as their tilting and power information.

Figure 2:
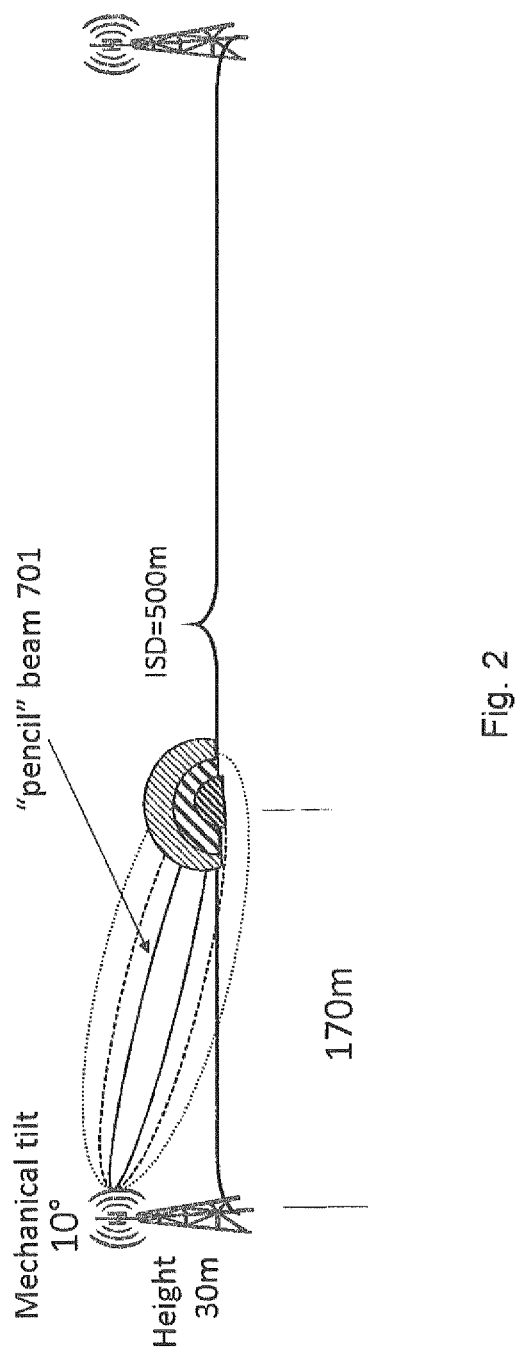
FIG. 2 shows schematically a single beam with its contour graph on the plane.

Based on the information of the beam configurations and the corresponding signal measurements, the location of the UE can be estimated using a contour graph that corresponds to these particular configurations. A simple example of a contour graph associated with the transmission of a single beam is depicted in FIG. 2. In the example of FIG. 2, the contour graph of a beam belonging to the "pencil beam" group is shown, transmitted from an access point of a given height and with given beam tilting. Differently hashed areas of the contour graph correspond to different signal strengths (powers) of the reference signal of the beam at the respective locations. The dashed lines across the solid line representing the "pencil" beam in FIG. 2 denote the attenuation of the received power in the area around the area where the beam is pointing to. The specific numerical values included in FIG. 2 indicate that the area covered by specific beams depends on the particular configurations used at the access point, including height of the tower and tilt of the specific beam.

As can be seen, an estimation of the area where the UE can potentially be located can be extracted by measuring the signal strength (e.g., via the RSRP) of the UE for a given beam.

Figure 3:
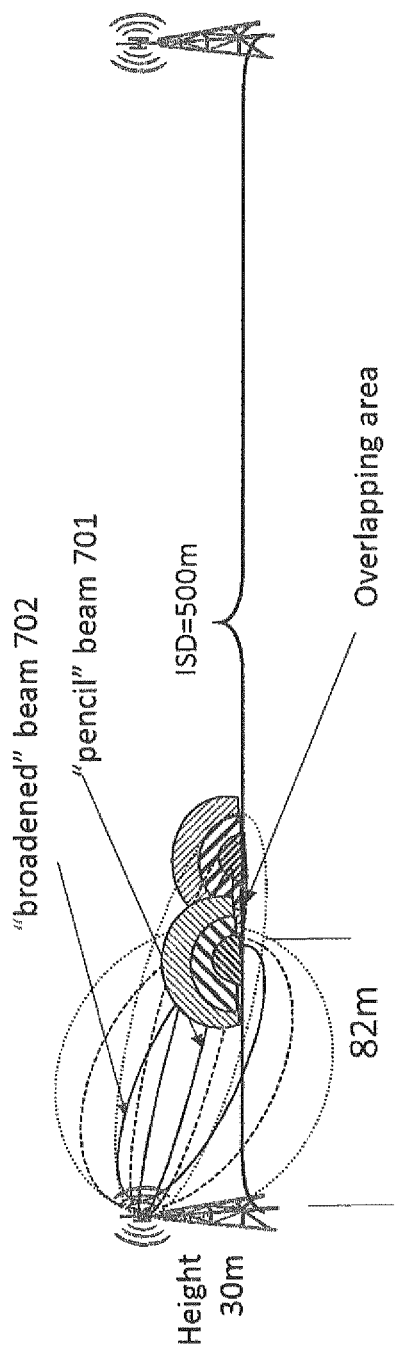
FIG. 3 shows schematically two beams having different elevations with their contour graphs.

The method according to some example embodiments of the invention is illustrated with more details in FIG. 3: The base station (via the access point) transmits the beam reference signals in a time-division fashion and/or frequency-division fashion using a beam sweeping pattern. As an example, FIG. 3 depicts a case where the UE is in the overlapping region of a pencil beam and a broadened beam. The respective contour plots are indicated by differently oriented hashing corresponding to the contour plot shown in FIG. 2 for a single beam. Note that the absolute values of the received signal strengths for the two beams may be same or different in corresponding regions of the contour plots. I.e., each of the two shown contour plots may have its own absolute scale.

UE performs measurements of received signal strengths of the beam reference signals and reports the measured signal strengths (received powers) to the base station.

At the base station or a location server, two or more beams are selected, whereof at least one beam has a different elevation (i.e. belongs to a different group if the beams of the UE are arranged in groups) than the other beams. This selection is performed based on the configuration data stored in the base station or transmitted to the location server.

If the terminal is in the overlapping region of the contour plots, the elevation of a connecting line connecting the access point and the terminal can be determined based on the measured signal strengths and the beam configurations (elevations of the beams, transmit powers of the beams). For example, each combination of two areas of the contour plots of the two beams in FIG. 3 corresponds to a certain ratio of the signal strengths (due to the given elevations and transmit powers). By determining the ratio, one may determine the corresponding overlapping area. If a certain beam propagation model is used, one may determine for each of the beams a respective volume in space where the calculated (expected) signal strength is equal to the measured signal strength (within given tolerances and taking into account the finite granularity by which the signal strength (received power) is indicated). Thus, the terminal is in the volume where the two calculated volumes overlap.

If the beams used for estimating the elevation of the connecting line are differently horizontally oriented (have different azimuths), this difference may be taken into account in the estimation, too. In addition, such a difference in azimuths may be used to estimate the azimuth of the connecting line, similar as in [1].

In general, one may perform a fitting procedure in order to obtain the elevation of the connecting line matching best to the measured signal strengths.

If the height of the terminal relative to the access point is known (e.g. assume that the base station and the terminal are on a plane; in this case, the relative height is equal to the height of the access point above the plane), one may calculate the distance of the terminal from the access point based on the estimated elevation and the height.

In addition to the signal strength measurements of the beams, information on the Timing Advance can also be utilized for better accuracy of the estimation. This is in particular useful if the base station and the terminal are not located on a plane but on a terrain having a 3D structure (mountains, valleys etc.). From the Timing Advance, the distance can be estimated and, thus, together with the estimated elevation, the height of the terminal relative to the access point may be estimated Additionally to the case of positioning based on beam measurements from beams transmitted by a single cell, the method can be trivially extended to the case where measurements from beams transmitted from different cells are utilized. In this case, the overlapping area and the respective contour plots correspond to outer "pencil" (in the most common scenario) beams from different cells. Then, such measurements along with the specific beam configurations of neighboring cells may be transmitted to the location module for position estimation.

The estimation of the elevation of the connecting line may be carried out at a positioning module. Such a positioning module may be included e.g. in the base station or the location server. This location server can be the E-SMLC used for LTE positioning, or any other location server used for 5G positioning. The information processed in the positioning module may include beam-specific measurements across beams with different elevation (i.e. from different beam groups (e.g., outer—pencil—beams and inner—broadened—beams)); beam tilting information and beam-specific power information, which is used to map the received signal power into geographical areas (cf. contour plots in FIG. 3).

An example of the signaling transmitted to the location server for estimating the position of the UE according to some example embodiments of the invention is as follows, provided the location server is aware of tilt and transmit power of the beams (may be preconfigured in location server, or transmitted from BS to location server in advance):

ID of the best beam of serving cell
RSRP and/or RSRQ of best beam of serving cell
ID of second best beam of the serving cell
RSRP and/or RSRQ of second best beam of serving cell
ID of best beam of neighboring cell (if plural cells are used)
RSRP and/or RSRQ of neighboring cell (if plural cells are used)
Timing advance of serving cell RSRP refers to an absolute signal strength indicator (i.e., including the power from all resource blocks used), whereas RSRQ normalizes RSRP over the number of resource blocks used. RSRQ is thus insensitive to the resources allocated to such reference signals, and may be preferred in some cases. In the terms of the present application, each of RSRP and RSRQ may be considered as an indication of a received beam power.

If adopted by the 3GPP standards, this method will correspond to a modification of the following messages included in E-CID positioning method in LTE (see [4]):
- ECID-ProvideCapabilities to be enhanced with the capabilities of target device with respect to beam ID
  - Modification of ecid-MeasSupported to include beam specific measurements
- ECID-RequestLocationInformation to be enhanced with RequestBeamInformation
  - Potential content: primary beam measurements; primary beam ID; secondary beam measurements; secondary beam ID
- ECID-TargetDeviceErrorCauses to be enhanced with new field containing the specific error causes of beam specific measurements.

Figure 5:
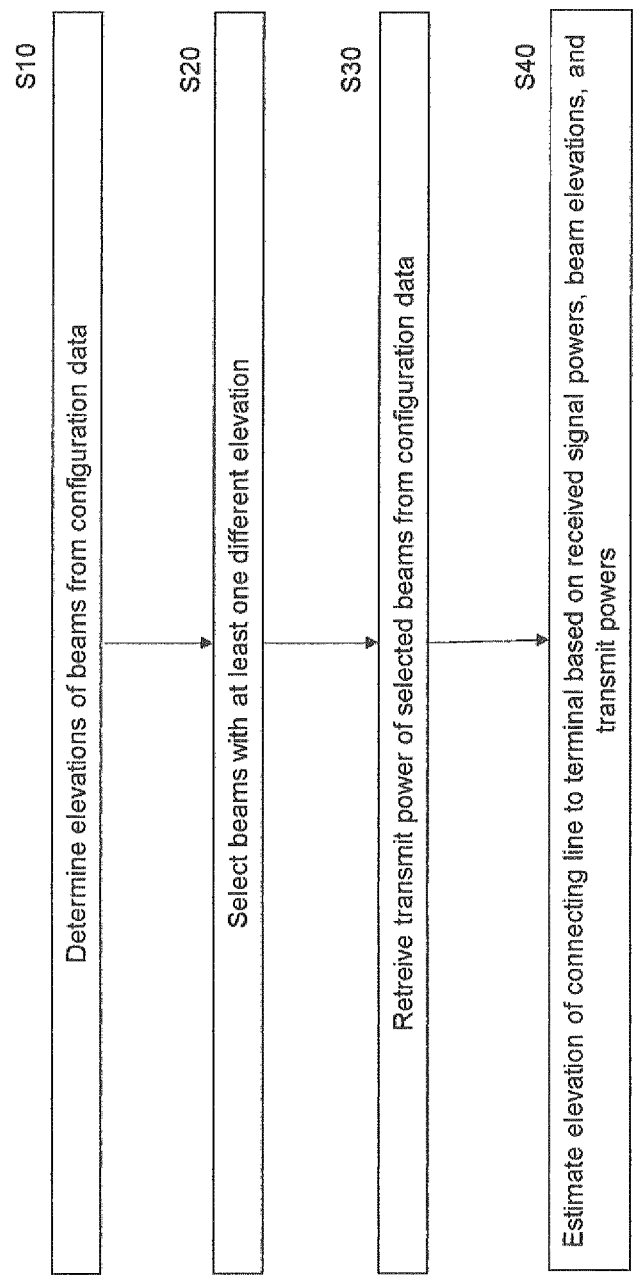
FIG. 5 shows a method according to an example embodiment of the invention.
Figure 4:
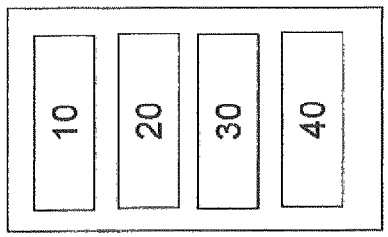
FIG. 4 shows an apparatus according to an example embodiment of the invention.

FIG. 4 shows an apparatus according to an example embodiment of the invention. The apparatus may be a positioning module which may be implemented in a base station (e.g. gNB) or location server or an element thereof. FIG. 5 shows a method according to an example embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for determining 10, means for selecting 20, means for retrieving, 30, and means for estimating 40. The means for determining 10, means for selecting 20, means for retrieving, 30, and means for estimating 40 may be a determining means, selecting means, retrieving means, and estimating means, respectively. The means for determining 10, means for selecting 20, means for retrieving, 30, and means for estimating 40 may be a determiner, selector, retriever, and estimator, respectively. The means for determining 10, means for selecting 20, means for retrieving, 30, and means for estimating 40 may be a determining processor, selecting processor, retrieving processor, and estimating processor, respectively.

The means for determining 10 determine a respective elevation of each of plural beams from an access point based on stored configuration data (S10). Each of the plural beams is identified by a respective identification included in an indication received from a terminal. The indication comprises the identification of the respective beam and an information on a respective received beam power.

The means for selecting 20 selects a first beam and a second beam among the plural beams such that the elevation of the first beam determined based on the stored configuration data is different from the elevation of the second beam determined based on the stored configuration data (S20).

The means for retrieving 30 retrieves, from the stored configuration data, a first transmit power of the first beam and a second transmit power of the second beam (S30).

The means for estimating 40 estimates an estimated elevation of a connecting line connecting the access point and the terminal based on the first received beam power, the second received beam power, the first transmit power, the second transmit power, the first elevation, and the second elevation (S40).

Figure 6:
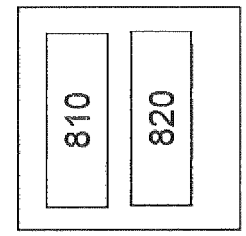
FIG. 6 shows an apparatus according to an example embodiment of the invention.

FIG. 6 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform the method according to FIG. 4.

The term "access point" represents a location from which the beams are effectively transmitted. Typically, it is on the antenna (array), such as the centre of the antenna (array). If different beams are transmitted from plural effective locations of a same height (but with different azimuths), the access point may indicate a position closest to the terminal on a ring or a portion of a ring at the height from which the beams are transmitted. In general, if different beams are transmitted from plural effective locations, the access point may be obtained as an average of the respective locations. Typically, distances between different locations from where the beams are transmitted are rather small compared to the distance to the terminal (e.g., less than $\frac{1}{20}$, or less than $\frac{1}{50}$, or less than $\frac{1}{100}$ of the distance to the terminal). In these cases, the difference between the locations may be ignored, and any of the locations (or their average) may be considered as the access point. In some example embodiments, the distance between different access points of different beams is additionally taken into account when estimating the elevation.

In some example embodiments, the elevation is estimated based on the ratio of the BRSRPs of at least two beams. In some example embodiments of the invention, the elevation is estimated based on the absolute values of the BRSRPs. In these embodiments, expected BRSRPs are determined using a propagation model for the beams. The terminal is in a volume where the expected BRSRPs coincide (within a given tolerance) with the BRSRPs measured by the terminal.

Instead of reference signals other radio signals with known power may be used to estimate the elevations if the UE measures and reports their received power.

The numerical values of the height, tilt, ISD, distance from the access point etc. indicated in some of the figures are example values only. They do not limit the invention in any way.

Some example embodiments of the invention are described which are based on a 3GPP network (e.g. NR). However, the invention is not limited to NR. It may be applied to any generation (3G, 4G, 5G, etc.) of 3GPP networks. However, the invention is not limited to 3GPP networks. It may be applied to other radio networks where beams with different elevations are emitted by a base station.

A UE is an example of a terminal. However, the terminal (UE) may be any device capable to connect to the radio network such as a MTC device, a D2X device etc.

A cell may be represented by the base station (e.g. gNB, eNB, etc.) serving the cell. The base station (cell) may be connected to an antenna (array) serving the cell by a Remote Radio Head. A base station may be realized as a combination of a central unit (one or plural base stations) and a distributed unit (one per base station). The central unit may be employed in the cloud.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a base station or a location server, or a component (such as a positioning module) thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
   at least one processor; and
   at least one memory including computer program code, the at least one memory and the computer program code configured to, with the at least one processor, cause the apparatus to:
   determine a respective elevation of each of plural beams from an access point based on stored configuration data, wherein each of the plural beams is identified by a respective identification included in an indication comprising the identification of the respective beam and an information on a respective received beam power, and the indication is received from a terminal;
   select a first beam and a second beam among the plural beams such that elevation of the first beam is different from elevation of the second beam;
   retrieve, from the stored configuration data, a first transmit power of the first beam and a second transmit power of the second beam;
   estimate an estimated elevation of a connecting line connecting the access point and the terminal based on beam-specific reference signal measurements by the terminal, wherein the beam-specific reference signal measurements by the terminal comprise first received beam power, second received beam power, the first transmit power, the second transmit power, the elevation of the first beam, and the elevation of the second beam;
   estimate a position of the terminal using the beam-specific reference signal measurements by the terminal in conjunction with beam configuration information of the access point;
   transmit the beam configuration information of the plural beams from the access point, wherein the beam configuration information comprises a number of transmitted beams per cell, and grouping, tilting and power information of the transmitted beams; and
   estimate the position of the terminal using a contour graph which is used to map received signal power into geographical areas that correspond to a specific beam configuration.

2. The apparatus according to claim 1, wherein the at least one memory and the computer program code are further configured, with the at least one processor, to cause the apparatus to:
   estimate an estimated distance between the access point and the terminal based on the estimated elevation and a preconfigured height information.

3. The apparatus according to claim 2, wherein the at least one memory and the computer program code are further configured, with the at least one processor, to cause the apparatus to:
   retrieve a timing advance information for the terminal; and
   estimate a height of the terminal based on the timing advance information and the estimated elevation.

4. The apparatus according to claim 3, wherein the at least one memory and the computer program code are further configured, with the at least one processor, to cause the apparatus to:
   determine a first azimuth of the first beam and a second azimuth of the second beam based on the stored configuration data; and
   estimate the estimated elevation of the connecting line additionally based on the first azimuth and the second azimuth.

5. The apparatus according to claim 4, wherein the at least one memory and the computer program code are further configured, with the at least one processor, to cause the apparatus to:
   determine a respective azimuth of each of the plural beams based on the stored configuration data;
   select a third beam among the plural beams such that an azimuth of the third beam is different from the azimuth of the first beam;
   retrieve, from the stored configuration data, a third transmit power of the third beam; and
   estimate an estimated azimuth of the connecting line based on the first received beam power, third received beam power, the first transmit power, the third transmit power, the first azimuth, and third azimuth.

6. The apparatus according to claim 5, wherein the at least one memory and the computer program code are further configured, with the at least one processor, to cause the apparatus to:
   estimate the estimated azimuth of the connecting line additionally based on first elevation and third elevation.

7. The apparatus according to claim 6, wherein the at least one memory and the computer program code are further configured, with the at least one processor, to cause the apparatus to:
   estimate the estimated elevation by determining a first volume and a second volume, and determining an overlap of the first volume and the second volume; wherein
   in the first volume, based on the transmit power, the elevation of the first beam, and a model of beam propagation, a first expected beam power of the first beam corresponds to the first received beam power, and
   in the second volume, based on the second transmit power, the elevation of the second beam, and the model of beam propagation, a second expected beam power of the second beam corresponds to the second received beam power.

8. A method, comprising:
- determining a respective elevation of each of plural beams from an access point based on stored configuration data, wherein each of the plural beams is identified by a respective identification included in an indication comprising the identification of the respective beam and an information on a respective received beam power, and the indication is received from a terminal;
- selecting a first beam and a second beam among the plural beams such that elevation of the first beam is different from elevation of the second beam;
- retrieving, from the stored configuration data, a first transmit power of the first beam and a second transmit power of the second beam;
- estimating an estimated elevation of a connecting line connecting the access point and the terminal based on beam-specific reference signal measurements by the terminal, wherein the beam-specific reference signal measurements by the terminal comprise first received beam power, second received beam power, the first transmit power, the second transmit power, the elevation of the first beam, and the elevation of the second beam;
- estimating a position of the terminal using the beam-specific reference signal measurements by the terminal in conjunction with beam configuration information of the access point;
- transmitting the beam configuration information of the plural beams from the access point, wherein the beam configuration information comprises a number of transmitted beams per cell, and grouping, tilting and power information of the transmitted beams; and
- estimating the position of the terminal using a contour graph which is used to map received signal power into geographical areas that correspond to a specific beam configuration.

9. The method according to claim 8, further comprising estimating an estimated distance between the access point and the terminal based on the estimated elevation and a preconfigured height information.

10. The method according to claim 9, further comprising retrieving a timing advance information for the terminal; estimating a height of the terminal based on the timing advance information and the estimated elevation.

11. The method according to claim 10, further comprising determining a first azimuth of the first beam and a second azimuth of the second beam based on the stored configuration data;
- estimating the estimated elevation of the connecting line additionally based on the first azimuth and the second azimuth.

12. The method according to claim 11, further comprising determining a respective azimuth of each of the plural beams based on the stored configuration data;
- selecting a third beam among the plural beams such that an azimuth of the third beam is different from the azimuth of the first beam;
- retrieving, from the stored configuration data, a third transmit power of the third beam;
- estimating an estimated azimuth of the connecting line based on the first received beam power, third received beam power, the first transmit power, the third transmit power, the first azimuth, and third azimuth.

13. The method according to claim 12, further comprising estimating the estimated azimuth of the connecting line additionally based on first elevation and third elevation.

14. The method according to claim 13, further comprising the estimated elevation is estimated by determining a first volume and a second volume, and determining an overlap of the first volume and the second volume; wherein
- in the first volume, based on the first transmit power, the first elevation, and a model of beam propagation, a first expected beam power of the first beam corresponds to the first received beam power, and
- in the second volume, based on the second transmit power, the second elevation, and the model of beam propagation, a second expected beam power of the second beam corresponds to the second received beam power.

15. A computer program embodied on a non-transitory computer-readable medium, said computer program comprising a set of computer-readable instructions which, when executed on an apparatus, is configured to cause the apparatus to carry out the method according to claim 14.

* * * * *